United States Patent Office 3,449,091
Patented June 10, 1969

1

3,449,091
HALIDE-MODIFIED PHOSPHONITRILIC
CHLORIDES
George M. Nichols, Chicago, Ill., assignor to E. I. du Pont
de Nemours and Company, Wilmington, Del., a corporation of Delaware
No Drawing. Continuation-in-part of application Ser. No.
126,871, June 26, 1961. This application Jan. 27, 1967,
Ser. No. 612,087
Int. Cl. C01b 21/52
U.S. Cl. 23—357                                                10 Claims

ABSTRACT OF THE DISCLOSURE

Halide modified phosphonitrilic chloride polymeric compositions useful as high temperature lubricants, having the formula $$Cl[PCl_2=N]_nPCl_3{}^+EX_{(v+1)}{}^-$$

wherein E is an element having an electronegativity value of from 1.2 to 2 and differs in electronegativity from the halogen portion of the halide by a maximum of 2.5, X is halogen, $v$ is the valence of element E and $n$ is from 1 to 10 inclusive, are prepared by reacting phosphorus pentachloride with ammonium chloride and a halide wherein the nonhalogen portion of the halide is an element having an electronegativity value of 1.2 to 2 and differs in electronegativity from the halogen portion of the halide by a maximum of 2.5.

Cross reference to related application

This application is a continuation-in-part of Nichols application Ser. No. 126,871, filed June 26, 1961, now abandoned.

Background of the invention

The preparation of phosphonitrilic chlorides by the reaction of phosphorus pentachloride and ammonium chloride in sym-tetrachloroethane as solvent is known. Generally, the reaction product is a mixture of crystalline and liquid polymers having various degrees of polymerization. Because the liquid fraction of the polymer is liquid over a wide temperature range, i.e., from 0° C. to about 250° C., it is useful not only as an additive, but as a heat transfer medium, dielectric fluid, high-temperature lubricant, chemical intermediate, and as a working fluid in applications requiring a liquid having a wide range between the freezing and boiling point. However, it is well known in the art that when the liquid phosphonitrilic chlorides are heated in air at a temperature between about 250 and 350° C., a highly polymerized rubbery product results. Unfortunately, in the above-mentioned applications, temperatures as high as 250° C. and higher are sometimes encountered. The deleterious effect as a result of the further polymerization of the liquid polymeric phosphonitrilic chloride when used in the above-mentioned applications, to a rubbery solid, is obvious.

Summary of the invention

It has been discovered that novel halide modified phosphonitrilic chloride polymers that are liquid at room temperature and do not polymerize at temperatures of from about 250 to 350° C. and represented by the formula:

$$Cl[PCl_2=N]_nPCl_3{}^+EX_{(v+1)}{}^-$$

wherein E is an element having an electronegativity value of from 1.2 to 2 and differs in electronegativity from the halogen portion of the halide by a maximum of 2.5, X is halogen, $v$ is the valence of element E and $n$ is 1 to 10 inclusive, are prepared by a process which comprises mixing phosphorus pentachloride, ammonium chloride, at least about 0.50 mole of ammonium chloride being present for each mole of phosphorus pentachloride, about from 0.12 to 1 mole of a halide, for each mole of phosphorus pentachloride, wherein the nonhalogen portion of said halide is an element having an electronegativity value of from 1.2 to 2 and differs in electronegativity from the halogen portion of the halide by a maximum of 2.5, said values being based on Pauling's scale of electronegativity, with a chlorinated aromatic hydrocarbon as inert solvent at a temperature of from about 100° to 220° C., separating the reaction products and isolating the polymeric reaction product.

Preferred embodiments of the invention

Accordingly, I prepare modified phosphonitrilic chloride polymers which are liquid at or near room temperature and do not polymerize at temperatures of 250–350° C. by introducing a selected halide in the polymeric composition. Indeed, all of these modified products are pyrolytically stable and do not polymerize at temperatures up to at least about 538° C. in evacuated sealed systems, and several of them are fluid below −40° C., thus possessing extremely valuable combinations of wide liquid range and thermal stability and, therefore, particularly useful as a high temperature lubricant or a heat transfer medium.

The thermally stable novel compositions of the present invention are linear $(PNCl_2)_n$ recurring units terminating with $PCl_3$ and bonded to the selected halide, where $n$ is 1 to 10 inclusive, and can be represented by the formula mentioned above. More specifically, for example, when the selected halide is aluminum chloride and the procedure described hereinbelow in Example 2 is followed, the product has the following structure:

$$Cl[PCl_2=N]_nPCl_3{}^+AlSl^{4-}$$

where $n$ is 1 to 10. In order to form the novel compositions of the invention, the element and halogen involved in the selected halide must not have electronegativities differing by more than 2.5. Selected halides which do not meet this requirement do not form modified phosphonitrilic chloride polymers in accordance with the invention. Elements suitable in the invention are those having an electronegativity value between approximately 1.2 and 2.0. Such elements within the above specified electronegativity range are those in Groups Ib, IIb, IIIa, IIIb, IVa, IVb, Va, Vb, VIa, VIIa, and VIII of the Periodic Table and beryllium, magnesium, boron, aluminum, and silicon. The value of the electronegativity of the element and the halogen is based on Pauling's scale of electronegativity values as disclosed in "Nature of the Chemical Bond," 3rd edition, Cornell U. Press, 1960, p. 93, and recited hereinbelow:

PAULING'S TABLE

| Li | Be | B | | | | | | | | | | | C | N | O | F |
|---|---|---|---|---|---|---|---|---|---|---|---|---|---|---|---|---|
| 1.0 | 1.5 | 2.0 | | | | | | | | | | | 2.5 | 3.0 | 3.5 | 4.0 |
| Na | Mg | Al | | | | | | | | | | | Si | P | S | Cl |
| 0.9 | 1.2 | 1.5 | | | | | | | | | | | 1.8 | 2.1 | 2.5 | 3.0 |
| K | Ca | Sc | Ti | V | Cr | Mn | Fe | Co | Ni | Cu | Zn | Ga | Ge | As | Se | Br |
| 0.8 | 1.0 | 1.3 | 1.5 | 1.5 | 1.6 | 1.5 | 1.8 | 1.8 | 1.8 | 1.9 | 1.6 | 1.6 | 1.8 | 2.0 | 2.4 | 2.8 |
| Rb | Sr | Y | Zr | Nb | Mo | Tc | Ru | Rh | Pd | Ag | Cd | In | Sn | Sb | Te | I |
| 0.8 | 1.0 | 1.2 | 1.4 | 1.6 | 1.8 | 1.9 | 2.2 | 2.2 | 2.2 | 1.9 | 1.7 | 1.7 | 1.8 | 1.9 | 2.1 | 2.5 |
| Cs | Ba | La-Lu | Hf | Ta | W | Re | Os | Ir | Pt | Au | Hg | Tl | Pb | Bi | Po | At |
| 0.7 | 0.9 | 1.1-1.2 | 1.3 | 1.5 | 1.7 | 1.9 | 2.2 | 2.2 | 2.2 | 2.4 | 1.9 | 1.8 | 1.8 | 1.9 | 2.0 | 2.2 |
| Fr | Ra | Ac | Th | Pa | U | Np-No | | | | | | | | | | |
| 0.7 | 0.9 | 1.1 | 1.3 | 1.5 | 1.7 | 1.3 | | | | | | | | | | |

Although any of the halides, i.e., fluorides, chlorides, bromides, and iodides are suitable in the invention, "pseudo halogens" such as compounds containing a cyano (—CN) group or thiocyano (—NCS) group are also applicable. Chlorine is the preferred halogen, and the use of iron chloride, zinc chloride and aluminum chloride is particularly preferred.

The above modified phosphonitrilic chloride polymeric compositions of the invention are prepared by heating, in the presence of a chlorinated aromatic hydrocarbon, e.g., 1,2,4-trichlorobenzene, as inert solvent, phosphorus pentachloride, ammonium chloride, and a selected halide as defined above at a temperature between 100° C. and about 220° C., separating the reaction products from the solids and the volatile components, said isolating the liquid reaction product. At temperatures below 100° C., the reaction does not occur or is so slow as to be economically unfeasible. Temperatures above 220° C. may be used, provided that pressure is applied to maintain the solvent in the system; however, temperatures above 220° C. are not recommended because of the tendency of the products to darken at elevated temperatures. The preferred temperature range is 120–160° C. From 0.12 to 1 mole of the selected halide and preferably from 0.5 to 1.5 moles of ammonium chloride should be present for each mole of phosphorus pentachloride. It is significant to note that when less than 0.12 mole of the selected halide is provided for each mole of phosphorus pentachloride, the products are chiefly unmodified phosphonitrilic chloride polymers, i.e., phosphonitrilic chloride polymers which have no selected halide incorporated therein. Therefore, this reaction requires that at least the herein recited minimum amount of selected halide be present to produce the unexpected beneficial results. The use of more than 1 mole of the selected halide for each mole of phosphorus pentachloride provides no economic advantage and only necessitates the subsequent removal of excess unreacted selected halide.

Preferably, a chlorinated aromatic hydrocarbon, e.g., 1,2,4-trichlorobenzene, as inert solvent is used in the process of the invention. In prior art methods for the preparation of polymeric phosphonitrilic chlorides, the use of sym-tetrachloroethane as the solvent medium has been generally preferred. However, it has been found that, in preparing the modified phosphonitrilic chloride polymeric compositions of the invention, sym-tetrachloroethane cannot be used as the solvent because of the tendency of the sym-tetrachloroethane to decompose in the presence of the selected halides into "fragments", i.e., chloroalkyl groups, which attach randomly onto the phosphorus atoms of the phosphonitrilic chloride polymer. Obviously, the presence of such chloroalkyl groups on the modified phosphonitrilic chloride polymer structure is not desirable because of the lowering of the thermal stability of the modified phosphonitrilic chloride polymers. Representative chlorinated aromatic hydrocarbons that are inert solvents and can be used in the present invention include monochlorobenzene, o-dichlorobenzene and 1,2,4-trichlorobenzene. Of these, 1,2,4-trichlorobenzene is particularly preferred as this solvent provides the following advantages over sym-tetrachloroethane: (1) the liquid product is obtained in greater quantity; (2) the liquid product has improved color; (3) the product work-up is greatly facilitated; and (4) trichlorobenzene is less volatile and reduces the possibility of toxic vapor inhalation.

The amount of chlorinated aromatic hydrocarbon, e.g., 1,2,4-trichlorobenzene, used as solvent is not critical, provided that a sufficient amount is used to dissolve at least a portion of the solid reactants, i.e., phosphorus pentachloride and ammonium chloride. Of course, the reaction rate improves substantially when a significant portion of the solid reactants is in solution. The use of large quantities of solvent is not recommended because of the necessity of subsequent removal of the solvent from the reaction product.

The manner of recovering the desired modified phosphonitrilic chloride polymeric compositions is not critical, e.g., the solid material, if present in the reacted mixture, may be removed by any conventional methods suitable for separating a solid and a liquid phase, such as filtration, decantation, centrifuging, etc. The volatile materials, e.g., the solvent, may be also removed by conventional methods, e.g., distillation.

The following examples illustrate but are not meant to limit the instant invention. The viscosity of the products in the examples was determined with calibrated Cannon-Manning Semi-Micro viscometers in constant temperature baths by standard techniques. The pour point of the products in the examples is the lowest temperature at which the material will flow in a 1 3/16-inch diameter tube. The pour points were determined according to ASTM Method D–97–57 (ASTM Standards. 1958 edition, part 7, p. 50).

EXAMPLE 1

A mixture of 208 grams (1.0 mole) of phosphorus pentachloride, 75 grams (1.4 moles) of ammonium chloride, 27.3 grams (0.2 mole) of zinc chloride and 800 milliliters of 1,2,4-trichlorobenzene was charged to a 2000-milliliter, 3-necked flask. The flask was equipped with a mechanical stirrer, thermometer, thermocouple well, heating mantle, and a reflux condenser with an outlet tube leading to a sodium hydroxide solution to trap the hydrogen chloride gas evolved during reaction. The mixture was heated to 150° C. and vigorous hydrogen chloride evolution occurred. The reaction was allowed to continue at 150° C. for a period of six hours although hydrogen chloride evolution was nearly complete in one hour. Upon cooling to 25° C., the mixture separated into two layers. The upper layer, upon distillation, was found to be 1,2,4-trichlorobenzene containing a small amount of phosphonitrilic chloride trimer and tetramer; substantially no unidentified residue remained. The lower layer was approximately 25% trichlorobenzene and 75% dark liquid. The dark liquid was heated to 462° C./0.78 mm. Hg. to remove any volatile components and then filtered. The filtrate was approximately 60 grams of a pale yellow, viscous liquid having a pour point of —5° C. and a viscosity of 2,433 centistokes at 25° C.

Analysis of this liquid product showed the following composition, percent: P, 18.3; N, 6.3; Cl, 62.6; Zn, 11.3. The infrared spectrum of the zinc chloride-containing polymer product had a very strong band at 1270 cm.$^{-1}$ and a smaller band at 760 cm.$^{-1}$. These bands confirm the presence of the

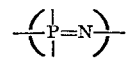

portion of the product. The experimental data indicated the product consisted mainly of a mixture of isomers of the formula $Cl[PCl_2=N]_nPCl_3^+ZnCl_3^-$, where $n$ is 1 to 10. The phosphorus nmr spectrum of the liquid product exhibited two peaks at −11.0 p.p.m. and at +15.0 p.p.m., the intensity of the +15.0 p.p.m. peak indicating an average $n$ value of 6 for the $(PCl_2=N)_n$ portion of the molecule.

When a portion of the above zinc chloride-containing product was subjected to heating in air at 250° C.–350° C., the product was stable and did not undergo further polymerization to a rubbery solid. When a portion of the above zinc chloride-containing product was subjected to a temperature as high as 600° C. for 10 hours in an evacuated sealed "Pyrex" tube, and then cooled to 25° C., no change in appearance occurred and the product remained liquid.

EXAMPLE 2

A mixture of 208 grams (1.0 mole) of phosphorus pentachloride, 80 grams (1.5 moles) of ammonium chloride, and 800 milliliters of 1,2,4-trichlorobenzene was charged to a 2000-milliliter flask as described in Example 1. The mixture was heated to 60° C. and 20 grams (1.5 moles) of aluminum chloride was added. The temperature was increased to 150° C. and maintained at this temperature for six hours. Vigorous hydrogen chloride gas evolution took place during the reaction. The reaction mixture was allowed to cool to 25° C. and the unreacted ammonium chloride removed by filtration. The solvent was removed by distillation (up to 85° C./1 mm. Hg) leaving 115.6 grams of a yellow liquid. Upon cooling, the liquid partially crystallized and the product was then filtered to give 14.8 grams of wet solid residue and 92.5 grams of yellow liquid.

Analysis of the liquid product was as follows percent: P, 20.9; N, 6.6; Al, 3.2; Cl, 70.3. The infrared spectrum of this aluminum-containing polymer had a very strong band at 1270 cm.$^{-1}$ and weak bands at 865 cm.$^{-1}$ and 765 cm.$^{-1}$, all of which are consistent with the

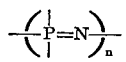

portion of the product. The experimental data indicated the product was a mixture of isomers of the formula $Cl[PCl_2=N]_nPCl_3^+AlCl_4^-$ where $n$ is 1 to 10. The phosphorus nmr spectrum of the liquid product exhibited two peaks at −11.0 p.p.m. and at +15.0 p.p.m., the intensity of the +15.0 p.p.m. peak indicating an average $n$ value of 6 for the $(PCl_2=N)_n$ portion of the molecule. When a portion of the above aluminum-containing product was subjected to heatin gin air at 250–350° C., the product was stable and did not undergo further polymerization to a rubbery solid. When a portion of the above aluminum chloride-containing product was subjected to a temperature as high as 538° C. for 10 hours in an evacuated sealed "Pyrex" tube and then cooled to 25° C., no change in color occurred and the product remained liquid.

EXAMPLE 3

A mixture of 312 grams (1.5 moles) of phosphorus pentachloride, 112 grams (2.1 moles) of ammonium chloride, and 1200 milliliters of 1,2,4-trichlorobenzene was heated to 129° C. in a 2000-milliliter flask as described in Example 1. Boron trichloride then was bubbled through the mixture as the temperature was increased to 150° C. and maintained at this temperature for three and one-half hours. A total of 34.2 grams (0.29 mole) of boron trichloride was used. After the mixture was cooled to 25° C., the unreacted ammonium chloride was removed by filtration of the mixture and the solvent then was distilled (up to 160° C./3 mm.) from the pale yellow filtrate. The light yellow liquid product (214 grams) partially crystallized upon cooling and was filtered in a drybox. Only 1 gram of wet solid residue was filtered off.

Analysis of the remaining yellow liquid product gave, percent: P, 15.3; N, 6.3; Cl, 72.7; B, 2.7. The infrared spectrum of this product had a very strong band at 1290 cm.$^{-1}$ and weak bands at 860 and 775 cm.$^{-1}$ confirming the presence of the

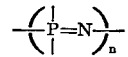

portion of the material. This product had a pour point of −44° C. and a viscosity of 46.2 centistokes at 25° C.

When a portion of the above boron-containing product was subjected to heating in air at 250–350° C., the product was stable and did not undergo further polymerization to a rubbery solid. When a portion of the above boron-containing product was subjected to a temperature as high as 538° C. for 10 hours in an evacuated sealed tube, no change in appearance occured.

EXAMPLE 4

The procedure of Example 3 was followed except that boron trifluoride was used instead of boron trichloride and the amounts of reactants used were as follows: 208 grams (1.0 mole) of phosphorus pentachloride, 75 grams (1.4 moles) of ammonium chloride, 10.8 grams (0.16 mole) of boron trifluoride, and 800 milliliters of 1,2,4-trichlorobenzene. The temperature of the mixture was maintained at 150° C. for a period of six hours instead of three and one-half hours. The product was worked up as described in Example 3, the solvent being distilled at a temperature up to 205° C./2 mm. Hg. A yellow liquid product (115.0 grams) was obtained which had a pour point of −52° C., a viscosity of 27.9 centistokes at 25° C., and was stable for 10 hours at 538° C. in an evacuated sealed "Pyrex" tube.

Analysis of this liquid was as follows, percent: P, 16.4; N, 7.1; Cl, 64.3; B, 2.7; F, 9.5. The infrared spectrum of the product obtained with boron trifluoride had a very strong band at 1290 cm.$^{-1}$ and weak bands at 845 cm.$^{-1}$ and 765 cm.$^{-1}$, confirming the presence of the

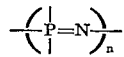

portion of the polymer.

EXAMPLE 5

A 22-milliliter (0.2 mole) portion of titanium tetrachloride was mixed with 208 grams (1.0 mole) of phosphorus pentachloride, 75 grams (1.4 moles) of ammonium chloride and 800 milliliters of 1,2,4-trichlorobenzene in a 2000-milliliter flask as described in Example 1. The mixture was heated to 150° C. for 22 hours. The bright yellow reaction mixture was cooled to 25° C. and filtered to remove unreacted ammonium chloride. The solvent was distilled off (up to 185° C./2 mm. Hg) and 147.7 grams of dark brown liquid remained. A portion of the liquid was found to be stable to polymerization at 538° C. for 10 hours in an evacuated sealed "Pyrex" tube.

Analysis of the liquid gave, percent: P, 14.9; N, 5.9; Cl, 71.1; Ti, 5.8. The infrared spectrum of the titanium-containing product had a very strong band at 1280 cm.$^{-1}$ and weak bands at 860 cm.$^{-1}$ and 765 cm.$^{-1}$, demonstrating the presence of the

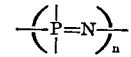

portion of the material.

EXAMPLE 6

A mixture of 208 grams (1.0 mole) of phosphorus pentachloride, 75 grams (1.4 moles) of ammonium chloride, 53.3 grams (0.2 mole) of aluminum bromide, and 800 milliliters of 1,2,4-trichlorobenzene was charged to a 2000-milliliter flask as described in Example 1 and heated to 115° C. at which temperature vigoroues evolution of hydrogen chloride gas began. After one hour, the temperature of the mixture had reached 150° C. and hydrogen chloride evolution nearly had subsided, indicating that reaction was nearly complete. However, the temperature was maintained at 150° C. to insure completion of the reaction. After the reaction mixture was cooled to approximately 25° C., the reaction mixture was filtered to remove unreacted ammonium chloride. The solvent and volatile components then were distilled at temperatures up to 205° C./3 mm. Hg. A black liquid which partially crystallized on cooling remained. The product was filtered to give a black liquid and a dark solid residue. The liquid portion then was heated to 500° C./1.1 mm. Hg without distillation. Volatile components were removed by low pressure heat treatment and a small amount of black solids which formed was removed by filtration. A deep red liquid remained which had a pour point of −49° C. and was stable to polymerization at aproximately 500° C. Elemental analysis of the red liquid was difficult. The infrared spectrum of the product obtained with aluminum bromide had a very strong band at 1270 cm.$^{-1}$ and weak bands at 860 cm.$^{-1}$ and 765 cm.$^{-1}$, confirming the presence of the

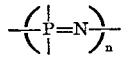

portion of the material.

EXAMPLE 7

In the following example, the use of triphenyltin chloride was preferred over stannic chloride in order to avoid formation of the very stable and insoluble $PCl_5 \cdot SnCl_4$ complex.

A mixture of 104 grams (0.5 mole) of phosphorus pentachloride, 32 grams (0.6 mole) of ammonium chloride, 38.5 grams (0.1 mole) of triphenyltin chloride and 400 milliliters of 1,2,4-trichlorobenzene was charged to a 1000-milliliter, 4-necked flask equipped with a mechanical stirrer, thermometer, thermocouple well, and a reflux condenser having an outlet tube leading to an aqueous sodium hydroxide solution to trap hydrogen chloride gas evolved during the reaction. The mixture gradually was heated to 200° C. over a seven-hour period. At several intervals during the reaction, refluxing clear liquids were collected. These liquids were identified as benzene and chlorobenzene. The dark reaction mixture was cooled to 25° C. and filtered to remove unreacted ammonium chloride. The solvent then was distilled from the product. The dark liquid crude product then was heated to 320° C./0.85 mm. Hg to remove any volatile components. After the mixture was cooled to 25° C., it was filtered to remove a small amount of black solids. A brown liquid (8.0 grams) which had a pour point of −18° C. was obtained. This liquid was heated to 520° C. in an open tube without polymerization occurring.

Analysis of this liquid was as follows, percent: P, 15.5; N, 6.5; Cl, 66.2; Sn, 11.4. The infrared spectrum of the tin-containing product had a very strong band at 1270 cm.$^{-1}$ and weak bands at 860 cm.$^{-1}$ and 765 cm.$^{-1}$, thus confirming the presence of the

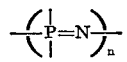

portion of the product.

EXAMPLE 8

A mixture of 208 grams (1.0 mole) of phosphorus pentachloride, 75 grams (1.4 moles) of ammonium chloride, 45.6 grams (0.2 mole) of antimony trichloride, and 800 milliliters of 1,2,4-trichlorobenzene was charged to a 2000-milliliter flask as described in Example 7. The mixture was heated to 150° C. for 11 hours, cooled to 25° C., and filtered to remove any solids. The solvent then was removed from the yellow filtrate by distillation, and a brown liquid (68.4 grams) remained. The liquid slowly crystallized on standing at 25° C. The solid material was resolidified under trichloroethylene. The solid was filtered from the mixture and dried to give a tan solid (64.0 grams) melting at 60–76° C. The product was a mixture of homologs of varying chain lengths.

Analysis of the product was as follows, percent: P, 17.1; N, 6.0; Sb, 9.9; Cl, 64.7. The infrared spectrum of the antimony-containing product had a very strong band at 1280 cm.$^{-1}$ and weak bands at 865 cm.$^{-1}$ and 765 cm.$^{-1}$, thus confirming the presence of the

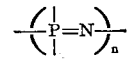

portion of the product. No change in the product occurred when it was heated at 538° C. for 10 hours in an evacuated sealed "Pyrex" tube.

EXAMPLE 9

A mixture of 208 grams (1.0 mole) of phosphorus pentachloride, 53.5 grams (1.0 mole) of ammonium chloride, 50 grams (0.2 mole) of thallous chloride and 700 milliliters of 1,2,4-trichlorobenzene was heated to 158° C. for four hours in a 200-milliliter flask as described in Example 1. The mixture was cooled to 25° C. as two separate liquid layers containing some white solid. The unreacted ammonium chloride was removed by filtration and the two layers of the filtrate separated. The solvent was distilled from the lower layer, leaving the dark liquid crude product. All volatile components were removed from the product by heating to 445° C./1.4 mm. Hg. The residue was allowed to stand for 24 hours at 25° C. and then was filtered to remove a small quantity of black solid which had formed during the heating process. In this manner, 60.6 grams of light-brown liquid product was obtained. It had a pour point of −52° C. and a viscosity of 26.8 centistokes at 25° C. A portion of the product was heated to 600° C. without any signs of polymerization.

Analysis of this liquid was as follows, percent: P, 15.2; N, 5.1; Cl, 56.8; Tl, 22.2. The infrared spectrum of the thallium-containing product had a very strong band at 1270 cm.$^{-1}$ and weaker bands at 860 and 760 cm.$^{-1}$, thus confirming the presence of the

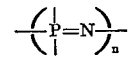

portion of the molecule.

EXAMPLE 10

A mixture of 208 grams (1.0 mole) of phosphorus pentachloride, 53.5 grams (1.0 mole) of ammonium chloride, 32.4 grams (0.2 mole) of ferric chloride and 800 milliliters of 1,2,4-trichlorobenzene was heated to 150° C. for four hours in a 2000-milliliter flask as described in Example 1. The mixture was cooled to 25° C. and then filtered to remove unreacted ammonium chloride. The solvent was removed by distillation, and the crude product was heated to 450° C./0.32 mm. Hg to remove any volatile components and then filtered after being cooled to 25° C. The filtrate was 121 grams of the desired liquid product. It has a pour point of −46° C., and a viscosity of 30.2 centistokes at 25° C.

Analysis of the liquid gave, percent: P, 18.4; N, 5.8; Cl, 68.6; Fe, 8.2. The infrared spectrum of the iron-containing product had a very strong band at 1290 cm.$^{-1}$ and weak bands at 860 and 765 cm.$^{-1}$, thus confirming the presence of the

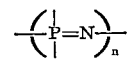

portion of the molecule. Experimental data indicated the product consisted mainly of a mixture of isomers of the formula $Cl[PCl_2=N]_nPCl_3^+FeCl_4^-$.

A portion of the iron-containing liquid was heated in air at 670° C. with no evidence of polymerization. In addition, after heating the liquid product at 600° C. under vacuum (2 mm. Hg) for ten hours, no change in appearance occurred and the product remained liquid.

I claim:

1. A process for preparing a halide modified phosphonitrilic chloride polymeric composition which is liquid at room temperature and does not polymerize at temperatures of from about 250 to 350° C. which comprises mixing phosphorus pentachloride, ammonium chloride, at least 0.50 mole of ammonium chloride being present for each mole of phosphorus pentachloride, about from 0.12 to 1 mole of a halide, for each mole of phosphorus pentachloride, wherein the non-halogen portion of said halide is an element having an electronegativity value of from 1.2 to 2 and differs in electronegativity from the halogen portion of the halide by a maximum of 2.5, said values being based on Pauling's scale of electronegativity, with a chlorinated aromatic hydrocarbon as inert solvent at a temperature of from about 100° to 220° C., separating the reaction products and isolating the polymeric reaction product.

2. The process of claim 1 wherein the halide is iron chloride.

3. The process of claim 1 wherein the halide is aluminum chloride.

4. The process of claim 1 wherein the halide is zinc chloride.

5. The process of claim 1 wherein the chlorinated aromatic hydrocarbon is trichlorobenzene.

6. Halide modified phosphonitrilic chloride polymeric compositions which are liquid at room temperature and do not polymerize at temperatures of from about 250 to 350° C. of the formula:

$$Cl[PCl_2{=}N]_nPCl_3{}^+EX_{(v+1)}{}^-$$

wherein E is an element having an electronegativity from 1.2 and 2 and differs in electronegativity from the halogen portion of the halide by a maximum of 2.5, said values being based on Pauling's scale of electronegativity, X is halogen, $v$ is the valence of element E and $n$ is 1 to 10 inclusive.

7. Halide modified phosphonitrilic chloride polymeric compositions of claim 6 wherein X is chlorine.

8. Halide modified phosphonitrilic chloride polymeric compositions of claim 7 wherein E is aluminum.

9. Halide modified phosphonitrilic chloride polymeric compositions of claim 7 wherein E is iron.

10. Halide modified phosphonitrilic chloride polymeric compositions of claim 7 wherein E is zinc.

FOREIGN PATENTS 1,085,508   7/1960   Germany.

OTHER REFERENCES

Schmulbach: "Progress In Inorganic Chemistry," vol. 4 (1962), p. 299.

OSCAR R. VERTIZ, *Primary Examiner.*

HOKE S. MILLER, *Assistant Examiner.*